3,647,878
N,N'-BIS-(PHENYL)-OXAMIDRAZONE

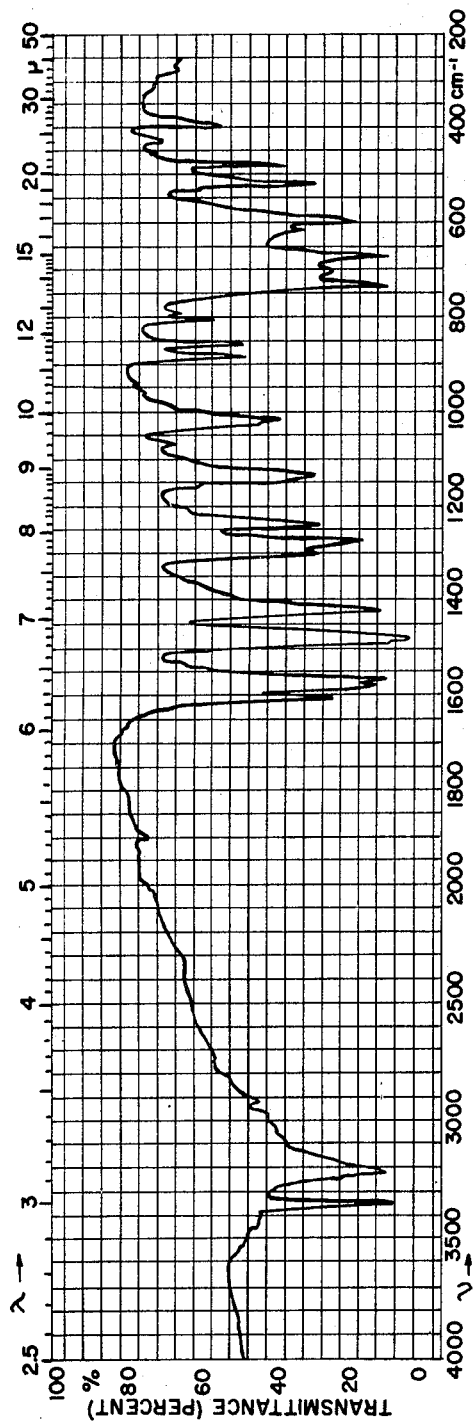

Ulrich Schulze, Elsenfeld, and Gerhard Meyer, Obernburg, Germany, assignors to Glanzstoff AG, Wuppertal, Germany
Filed July 2, 1969, Ser. No. 838,429
Claims priority, application Germany, July 10, 1968, P 17 68 880.1
Int. Cl. C07c *123/00*
U.S. Cl. 260—564 R    1 Claim

ABSTRACT OF THE DISCLOSURE

The compound N,N'-bis-(phenyl)-oxamidrazone which is represented by the three tautomeric formulae:

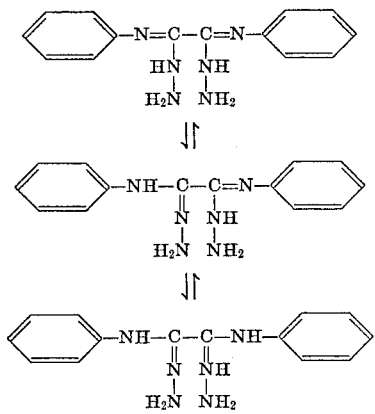

This is useful for the production of polyacyl-oxamidrazones which are valuable polymers, e.g. by reaction with terephthalic acid dichloride.

---

It is an object of the present invention to provide the novel compound N,N'-bis-(phenyl)-oxamidrazone according to the above tautomeric formulae and also to provide a method for the preparation of this compound.

In accordance with the invention, it has now been found that N,N'-bis-(phenyl)-oxamidrazone can be produced by reacting anhydrous hydrazine with bis-(phenyl)-oximidochloride in an inert organic solvent and in the presence of an acid acceptor such as soda (sodium carbonate) at temperatures between about —5° C. and +35° C. The reaction proceeds according to the following equation:

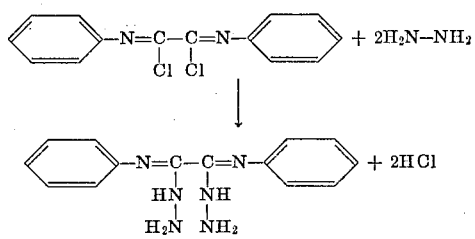

The bis-(phenyl)-oximidochloride and hydrazine are preferably reacted in stoichiometric amounts, i.e. using two mols of hydrazine for each mol of the oximidochloride. It is not necessary to employ one of the two reactants in excess since this measure does not result in any substantial improvement in yield. The hydrazine is expediently introduced in its water-free or substantially anhydrous state, and anhydrous conditions are preferably maintained throughout the reaction.

The bis-(phenyl)-oximidochloride can be produced in known manner from oxalic acid bis-anilide and phosphorous pentachloride (see R. Bauer, Chem. Ber. 40, 1907). The oxalic acid bis-anilide, sometimes referred to as "oxanilide", is readily accessible by reaction of oxalic acid diethyl ester with aniline.

The reaction of the invention generally proceeds at temperatures of about —5° C. to 35° C. It is favorable, however, to carry out the synthesis of the N,N'-bis-(phenyl)-oxamidrazone at approximately room temperature to avoid special heating or cooling means or at moderately elevated temperatures up to about 35° C.

It is expedient to carry out the reaction in this presence of one or more acid acceptors which have their conventional function of binding the HCl liberated in the reaction, thereby withdrawing HCl from the equilibrium and tending to force the reaction to completion. Anhydrous sodium carbonate has proven to be especially favorable as the added acid acceptor, because sodium chloride deposits or precipitates and can be easily separated from the simultaneously precipitating oxamidrazone product. It is also possible, however, to use any number of other readily available acid acceptors capable of binding the HCl, for example alkali metal or ammonium carbonates or bicarbonates. The acid acceptor is thus essentially any basic-reacting inorganic or organic compound used in an amount sufficient to combine with the HCl during the course of the reaction, it being understood that the acid acceptor must otherwise be substantially inert under the reaction conditions.

Suitable inert and anhydrous organic solvents are preferably those in which the N,N-bis(phenyl)-oxamidrazone product is substantially insoluble so as to permit an easy separation of the initial crude product. For this reason, acetonitrile has been found to be especially useful as the solvent. However, ether or carbon tetrachloride are also quite suitable. Although methanol or ethanol can be used, they are somewhat less suitable because the oxamidrazone product is slightly soluble in these solvents. Any number of suitable inert organic solvents can of course be investigated in a routine manner to assess their usefulness for the purpose of the invention, since the solvent primarily serves only as an inert liquid reaction medium.

In general, the synthesis of the N,N'-bis-(phenyl)-oxamidrazone can be carried out by admixing a mixture of anhydrous hydrazine and anhydrous acid acceptor, e.g. sodium carbonate, with a suspension of bis-(phenyl)-oximidochloride in an essentially dry and substantially water-free inert organic solvent such as acetonitrile while thoroughly mixing and maintaining a temperature of about 25–35° C. The initial yellow coloration of the reaction mixture disappears during the course of the reaction and a precipitate separates out. The reaction mixture is continuously stirred or mixed for another hour after initial mixing and is then filtered. The solid residue consists of N,N'-bis-(phenyl)-oxamidrazone and sodium chloride. This crude product is digested with an amount of dimethylformamide which is just sufficient to dissolve the oxamidrazone. After filtering off the undissolved sodium chloride, the filtrate is mixed with 2 to 3 times by volume of ether, whereby the N,N'-bis-(phenyl)-oxamidrazone precipitates in very pure form.

N,N'-bis-(phenyl)-oxamidrazone is a compound which crystallizes into colorless needles and melts at 163–164° C. It is soluble in dimethylformamide and tetrahydrofurfuryl alcohol, but is only slightly soluble in methanol, ethanol or water while being insoluble in ether or carbon tetrachloride. This new compound is further identified by its infrared spectrum as shown in the accompanying drawing.

The initial oximidochloride reactant, which is not claimed herein, can be synthesized in the following manner. With the exclusion of moisture, there are introduced into an electrically heated three-necked flask of 4 liters capacity 2 molar proportions of oxalic acid bis-anilide in 1100 ml. of benzene and 4.4 molar proportions of PCl₅. At a maximum temperature of 60° C. the reaction mixture is stirred until a deep yellow only slightly turbid solution remains from the initial yellow-colored suspension. At an internal temperature of 25–30° C., 500 ml. of benzene is drawn off in a vacuum with the help of a rapid distillation attachment. The precipitating oximidochloride is quickly filtered off under suction, washed with petroleum ether and can be stored in this state up to 25 hours in an evacuated desiccator over $CaCl_2$. For separation of impurities, especially $POCl_3$, the crude product is preferably recrystallized from hexane or better from acetonitrile. The separated deeply red mother liquor containing the impurities is rejected after concentration thereof in order to recover at least part of the pure solvent. The melting point of the pure bis-(phenyl)-oximidochloride is 113° C.

The invention is further illustrated in detail by the following example:

EXAMPLE

There are admixed in a 500 ml. three-necked flask a mixture of 13.5 grams (0.40 mol) of anhydrous hydrazine and 85 grams (0.80 mol) of anhydrous sodium carbonate with a suspension of 52.7 grams (0.19 mol) of bis-(phenyl)-oximidochloride in 200 ml. of dry (water-free) acetonitrile. The reaction commences with the disappearance of the yellow coloration. Then after stirring for a period of one hour, the reaction mixture is filtered. The solid residue consists essentially of N,N'-bis-(phenyl)-oxamidrazone and sodium chloride. This crude solid product is digested with an amount of dimethylformamide just sufficient to dissolve the oxamidrazone. After filtering off the undissolved sodium chloride, the filtrate is admixed with a two- to three-fold amount of ether, whereby the pure oxamidrazone separates out in a yield of 15.5 grams (33% of theory). The precipitated product is in the form of colorless needles having a melting point of 163–164° C. This N,N'-phenyl-substituted oxamidrazone is identified by analysis as having the three tautomeric formulae first given hereinabove.

The preferred utility for the new compound as an intermediate or monomeric reactant in the production of valuable polyacyloxamidrazones is fully disclosed in the copending U.S. application of Ulrich Schulze and Gerhard Meyer, Ser. No. 838,681, filed July 2, 1969, now Pat. No. 3,560,452. In essence, the N,N'-bis-(phenyl)-oxamidrazone is reacted with a dicarboxylic acid dihalide, preferably terephthalic acid dichloride in a suitable solvent or mixture of solvents, e.g. hexamethylphosphoric acid triamide or dimethyl formamide, in the presence of an acid acceptor while stirring and withdrawing the heat of reaction to maintain a temperature of about 0° C. to 40° C. The resulting polyacyloxamidrazone is a valuable polymer capable of being formed into films or fibers and readily converted into the corresponding poly-bis-(1,2,4-triazole) by cyclodehydration, i.e. by heating at an elevated temperature of about 130–180° C. to drive off water and cause a cyclization into phenyl-substituted triazole groups along the polymer chain. This polytriazole polymer is distinguished by its thermal resistance and its resistance to solvents as well as polymer properties enhanced by the phenyl-substituted triazole rings in the polymer chain.

The invention is hereby claimed as follows:

1. N,N'-bis(phenyl)-oxamidrazone having the tautomeric formulae:

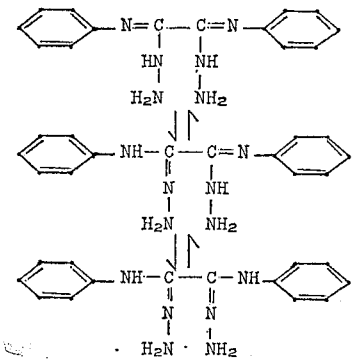

References Cited

UNITED STATES PATENTS 3,210,422   10/1965   Holsten et al. _____ 260—566

OTHER REFERENCES

Beilstein's Handbuch der Organische Chemie, vol. 15 (1932), p. 268.

BERNARD HELFIN, Primary Examiner

G. A. SCHWARTZ, Assistant Examiner

U.S. Cl. X.R.

260—566 D

PO-1050
(5/69)

UNITED STATES PATENT OFFICE
CERTIFICATE OF CORRECTION

Patent No. 3,647,878            Dated March 7, 1972

Inventor(s) Ulrich Schulze and Gerhard Meyer

It is certified that error appears in the above-identified patent and that said Letters Patent are hereby corrected as shown below:

Column 1, line 31, "NH" should read -- N --.

Column 3, line 2, "yellow only" should read -- yellow, only --; line 8, "25" should read -- 24 --.

Signed and sealed this 19th day of September 1972.

(SEAL)
Attest:

EDWARD M. FLETCHER, JR.                ROBERT GOTTSCHALK
Attesting Officer                      Commissioner of Patents